United States Patent [19]

Greene

[11] Patent Number: 4,530,060
[45] Date of Patent: Jul. 16, 1985

[54] AIRCRAFT SPEED CONTROL SYSTEM MODIFIED FOR DECREASED HEADWIND AT TOUCHDOWN

[75] Inventor: Leonard M. Greene, Chappaqua, N.Y.

[73] Assignee: Safe Flight Instrument Corporation, White Plains, N.Y.

[21] Appl. No.: 306,336

[22] Filed: Sep. 25, 1981

[51] Int. Cl.³ .................. G05D 1/12; G05D 1/08; G06F 15/48
[52] U.S. Cl. .................... 364/428; 244/181
[58] Field of Search ........... 364/428, 434, 435; 244/181, 182, 183, 188; 340/27 SS

[56] References Cited

U.S. PATENT DOCUMENTS

| | | | |
|---|---|---|---|
| 3,285,067 | 11/1966 | Greene | 73/178 |
| 3,486,722 | 12/1969 | Greene | 244/182 X |
| 3,586,268 | 6/1971 | Melvin | 244/181 |
| 3,594,553 | 7/1971 | McElroy | 364/435 X |
| 3,614,036 | 10/1971 | Foster | 244/181 X |
| 3,698,669 | 10/1972 | Miller | 244/181 |
| 3,814,912 | 6/1974 | Manke et al. | 364/428 X |
| 3,989,208 | 11/1976 | Lambregts | 364/424 X |
| 4,093,158 | 6/1978 | Clews et al. | 244/182 |
| 4,106,731 | 8/1978 | Bliss | 364/428 X |
| 4,133,503 | 1/1979 | Bliss | 340/27 SS |
| 4,189,777 | 2/1980 | Kuntman | 244/182 X |

Primary Examiner—Jerry Smith
Assistant Examiner—Michael R. Fleming
Attorney, Agent, or Firm—Edward A. Sokolski

[57] ABSTRACT

An aircraft speed control system wherein the commanded lift floor (minimum lift) is increased in accordance with an anticipated decrease in headwind between headwind during final landing approach and that anticipated at touchdown. The system includes means for generating a signal which is a function of the difference between the headwind aloft and the headwind anticipated at touchdown. This signal, provided it indicates a decreased headwind at touchdown, is used to modify the programmed lift signal (which is in accordance with the angle of attack of the aircraft) to compensate the decreasing headwind condition, i.e. to increase the commanded lift floor.

10 Claims, 4 Drawing Figures

AIRCRAFT SPEED CONTROL SYSTEM MODIFIED FOR DECREASED HEADWIND AT TOUCHDOWN

This invention relates to an aircraft speed control system, and more particularly to such a system in which the commanded lift floor (minimum lift) is increased in accordance with an anticipated decrease in headwind between headwind during final landing approach and that anticipated at touchdown.

In my U.S. Pat. No. 3,486,722, issued Dec. 30, 1969, a "votive" type aircraft speed control system is described in which the thrust of an aircraft is alternatively controlled in accordance with the greater of two error signals, one being a function of the lift of the aircraft, the other being a function of the airspeed of the aircraft; the first of these signals representing the programmed lift (that takes into account flap position) and the actual lift, the second being a signal representing the difference between the pilot selected airspeed and the actual airspeed.

It has been found that it is possible under certain conditions, namely where there is a significant decrease in headwind during the approach to touchdown, that there is a possibility of the aircraft falling short of the runway due to the decrease in lift attendant with such a headwind decrease.

The system of the present invention obviates this problem of prior art systems, such as the system described in my aforementioned U.S. Pat. No. 3,486,722, by providing a compensating signal for such a speed control system that changes the lift floor (minimum lift) signal as a function of any decrease in headwind between that during the final approach of the aircraft to that anticipated at touchdown. In this manner, the lift floor is increased, as may be necessary, to assure that the aircraft will always have sufficient lift and ground speed with decreases in headwind so that it will be capable of adequately reaching the runway and not falling short.

This desired end result is achieved in the system of the present invention by generating a signal in accordance with aircraft present headwind aloft by computing the difference between air speed and ground speed and then generating a signal in accordance with the difference between the headwind aloft and the headwind anticipated along the runway touchdown path. This difference signal is fed to a positive limiter which has an output signal only when the headwind aloft signal is greater than the measured runway headwind signal (indicating a decreased headwind at touchdown). This last mentioned signal is used to modify the programmed lift signal (which is in accordance with the angle of attack of the aircraft) to compensate the decreasing headwind condition, i.e., to increase the commanded lift floor.

It is therefore an object of this invention to obviate the possibility of falling short of the runway in an aircraft speed control system.

It is a further object of this invention to provide means for modifying the lift floor (minimum lift) signal in an aircraft speed control system in accordance with decreases in anticipated headwind between that during the aircraft's final approach and touchdown.

Other objects of this invention will become apparent as the description proceeds in connection with the accompanying drawings, of which:

The illustrative embodiment of the invention is described as a modification of the system of my U.S. Pat. No. 3,486,722 issued Dec. 30, 1969, and the specification and drawings of that patent are hereby incorporated into the present application by reference. The disclosure of my aforementioned patent is therefore but briefly summarized in the present application, reliance being made on the disclosure of that patent for completing the disclosure of the present application.

Figure 1:
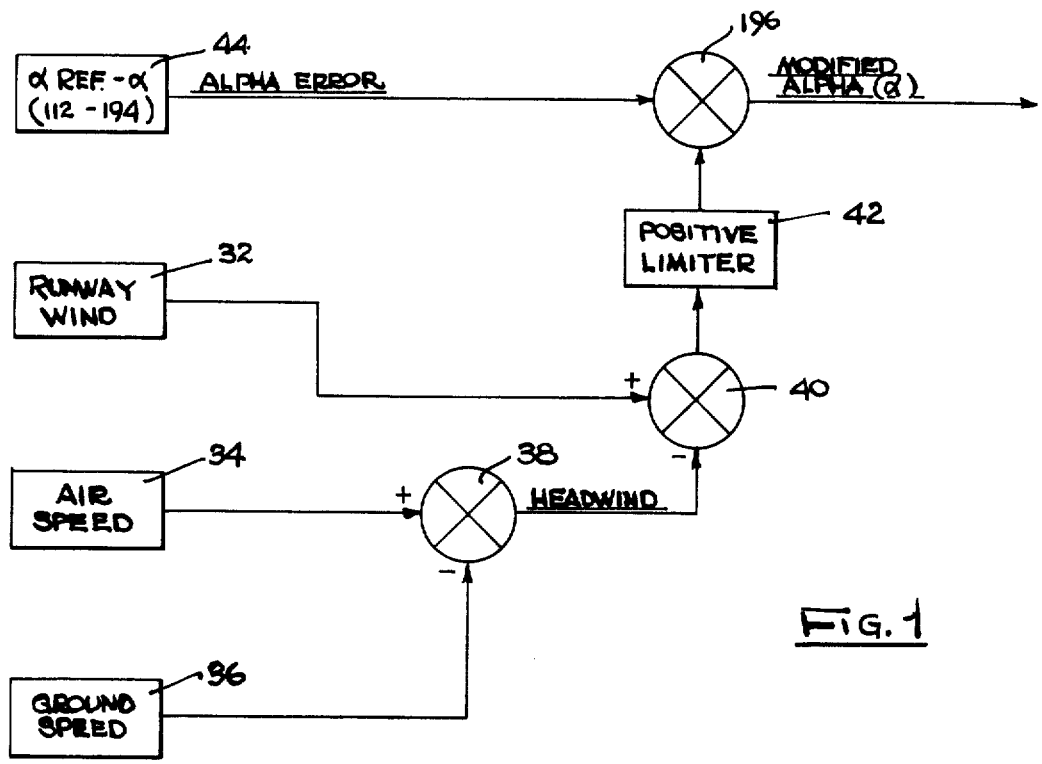
FIG. 1 is a functional block diagram illustrating the basic aspects of a first embodiment of the system of the invention.

Referring now to FIG. 1, a functional block diagram is shown illustrating the basic aspects of the system of the invention. Signals in accordance with airspeed 34 and ground speed 36 are generated in the conventional manner by means of suitable instrumentation which may comprise a pendulous accelerometer and vertical gyro for ground speed, and a pitot tube for airspeed. The difference between the airspeed and ground speed signals is computed in summing device 38 to provide an output signal in accordance with the headwind being encountered by the aircraft. A signal in accordance with runway wind 32 (i.e., the wind along the runway in the direction opposite to the landing direction) is generated either by means of a manual setting by the pilot in accordance with runway wind information from the control tower, or automatically by means of suitable telemetering equipment. The difference between the runway wind and the headwind is computed by means of summing device 40, the output of the summing device being fed to a positive limiter 42. Positive limiter 42 produces an output only when the headwind signal is greater than the runway wind signal, and with the polarity indicated for the headwind and runway wind, effectively cuts off all positive values of the output of summing device 40 and provides an output only in accordance with negative values of this output. Positive limiter 42 may comprise a conventional diode limiting circuit connected as a positive limiter. The output of positive limiter 42, which represents the magnitude of the decrease in headwind anticipated at touchdown, is fed to summing device 196 where it is summed with the "alpha" error signal. The alpha error is the difference between the commanded angle of attack of the aircraft and the measured angle of attack of the aircraft (i.e., the difference between outputs 112 and 194 in FIG. 2). This error signal thus represents the change in aircraft angle of attack needed to achieve the minimum acceptable lift condition. As is well known in the art, such a change in angle of attack and the incumbent increased lift condition can be achieved by increasing the thrust of the aircraft. The output of summing device 196 thus represents a modified minimum or "floor" "alpha" signal which is increased in accordance with an anticipated decreased headwind at touchdown. This signal effectively increases the lift floor signal of the votive system.

Figure 2:
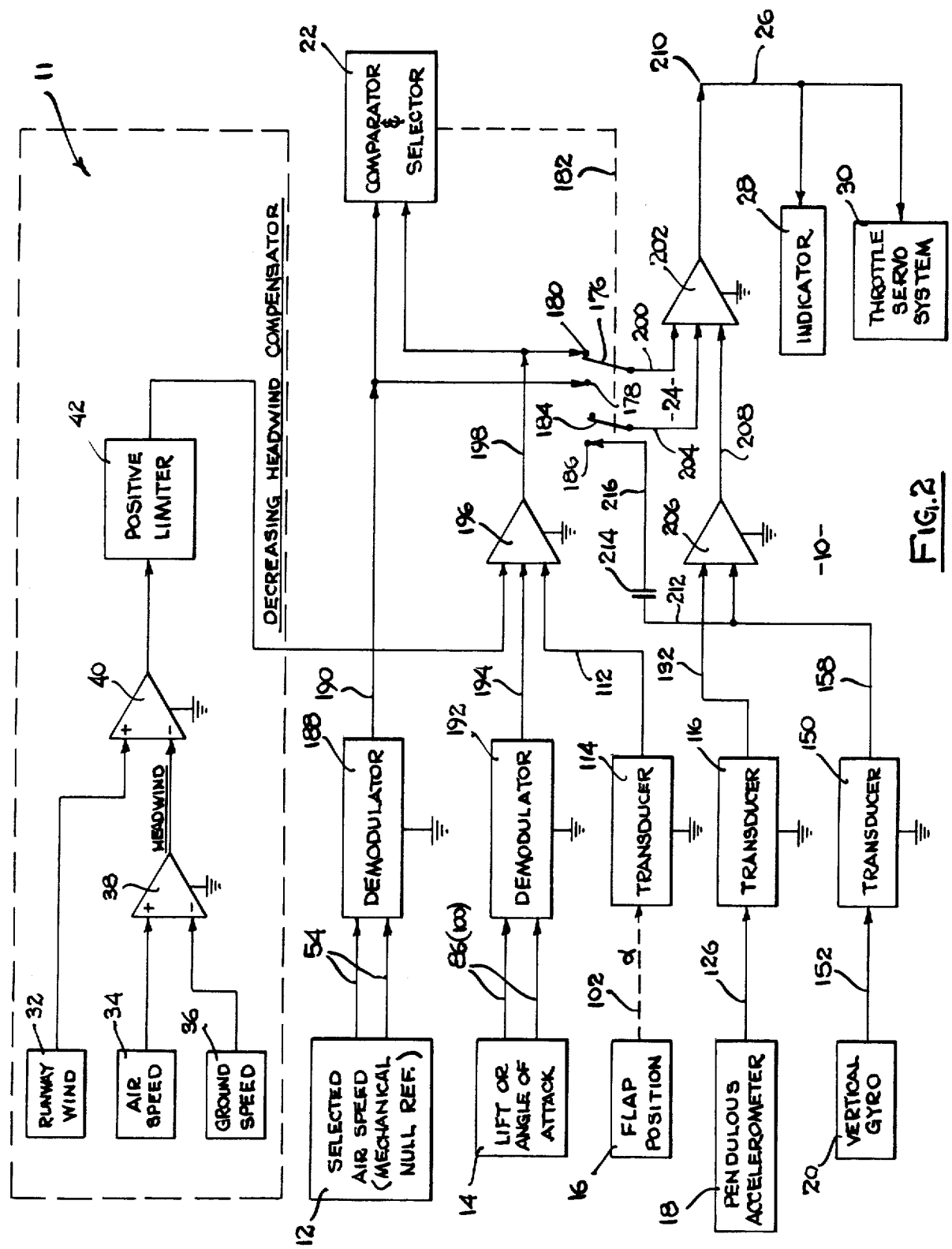
FIG. 2 is a functional block diagram illustrating the incorporation of the first embodiment of the system of the invention into an existing speed control system.

Referring now to FIG. 2, the system of the invention is illustrated as incorporated into the votive speed control system of my U.S. Pat. No. 3,486,722. FIG. 2 corresponds identically with FIG. 1 of said patent except for the addition of portion 11 shown within the dotted lines. The description of FIG. 1 of the patent and the details of the implementation of the components thereof are described fully in my U.S. Pat. No. 3,486,722 and will only briefly be alluded to here.

The system of the patent generates on output leads 54 a signal in accordance with the difference between indicated air speed and a pilot selected air speed, this signal being generated by means of a null type air speed indicator 12. This air speed error signal is appropriately demodulated by means of demodulator 188 and fed on output lead 190 to comparator and selector 22. A signal in accordance with the angle of attack of the aircraft 14, which also represents aircraft lift, is fed on leads 86 to demodulator 192, the output of demodulator 192 being fed on lead 194 to summing amplifier 196. A signal in accordance with the flap position, which represents the programmed angle of attack ($\alpha$) is fed as a mechanical signal by means of linkage 102 to transducer 114, which provides an output on lead 112 representing the programmed angle of attack. As already noted in connection with FIG. 1, the measured angle of attack signal is subtracted from the programmed angle of attack signal to produce an angle of attack ($\alpha$) error signal. Added to this error signal in summing amplifier 196 is the output of positive limiter 42 which represents the difference between present headwind and that anticipated at the runway. This signal, as already described, is generated by subtracting the measured ground speed signal 36 from the measured air speed signal 34 in summing amplifier 38, this head wind signal being subtracted from the measured runway wind signal 32, in summing amplifier 40. Positive limiter 42, as already mentioned, provides an output only for negative inputs from summing amplifier 40, i.e. for such inputs which represents a decrease in headwind during the final approach to touchdown.

In the balance of the system of U.S. Pat. No. 3,486,722, a signal in accordance with the forward acceleration of the aircraft independent of pitch attitude, is developed by means of pendulous accelerometer 18 and vertical gyro 20, the outputs of which are fed respectively on leads 126 and 152 to transducers 116 and 150 respectively. The outputs of transducers 116 and 150 are fed on leads 132 and 158 respectively to summing amplifier 206, the output of which is fed to lead 208 and represents the forward acceleration of the aircraft. This acceleration signal is fed to summing amplifier 202.

A signal in accordance with pitch rate is developed by means of pitch rate capacitor 214 which receives the output of transducer 150, this signal being used to avoid sluggishness of response to changes in air speed, as described in the aforementioned patent. Comparator and selector 22, as already noted, receives an input on line 190 in accordance with the air speed error signal, and on line 198 in accordance with the lift ($\alpha$) error signal. The comparator and selector selects the signal which commands the highest air speed and actuates relay contacts 176 and 184 of relay 24 in accordance with the selected signal. As shown in FIG. 2, the contacts are illustratively actuated to provide as a command signal the lift ($\alpha$) error indicating that this is the greater of the two error signals. This signal as already noted has added to it a signal in accordance with any decrease in headwind anticipated during the final approach to the runway. Summing amplifier 202 which receives this command signal feeds such signal on lead 210 as an output 26 to indicator 28 and throttle servo system 30, the indicator providing a visual indication of the error signal, throttle servo system 30 being responsive to this error signal, to increase air speed to compensate for the error.

Where runway wind is not available, an estimated value of runaway wind can be provided which estimate is conservative with respect to the speed loss of the aircraft in transition between landing approach and touchdown.

Thus, the system of the present invention avoids the possibility of undershooting a runway during a landing controlled by a speed control system, this end result being achieved by setting the lift error to an increased level in situations where a decreasing headwind is encountered during a landing approach which might cause the lift and ground speed to go below that needed to assure not falling short of the runway.

Figure 3:
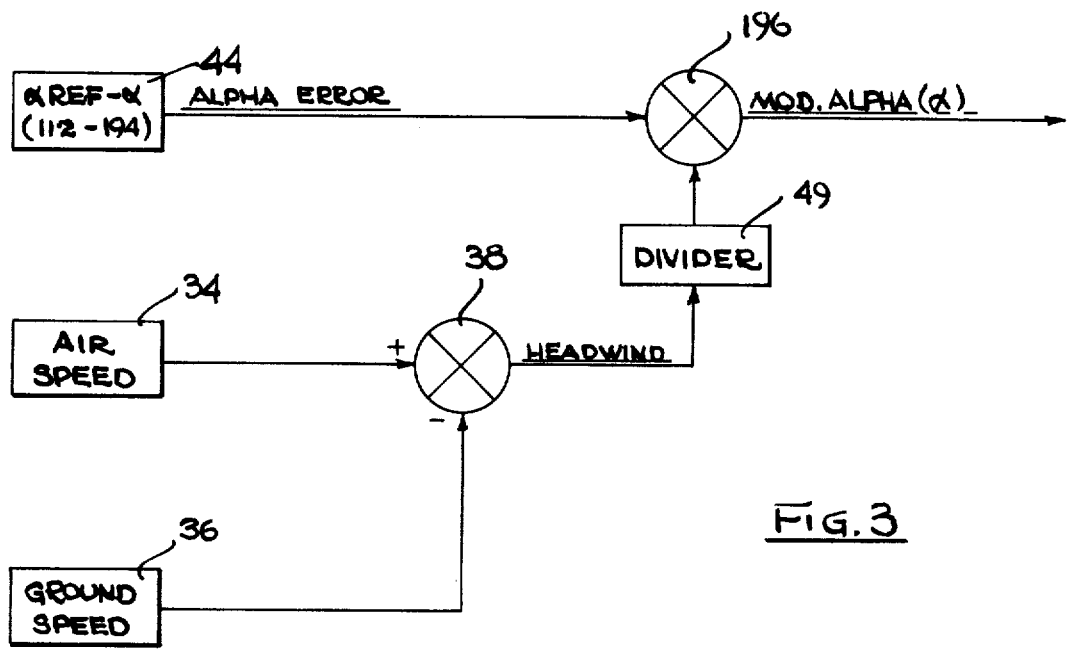
FIG. 3 is a functional block diagram of a second embodiment of the invention.

Referring to FIG. 3, a second embodiment of the invention is illustrated for use in situations where it is either impossible or impracticable to provide an input in accordance with runway wind. In this system, a signal which is a predetermined fraction of the headwind aloft is used to modify the alpha error to compensate for any decrease in headwind which may occur at touchdown. Typically, the fraction of the headwind aloft used to modify the alpha signal will be about one half.

As can be seen from FIG. 3, this end result is achieved by dividing the "headwind" output of summing device 38 in divider 49 to provide the predetermined fraction of the headwind aloft as an input to summing device 196. This compensation signal thus assures that any decrease in headwind at touchdown will be amply compensated for.

Figure 4:
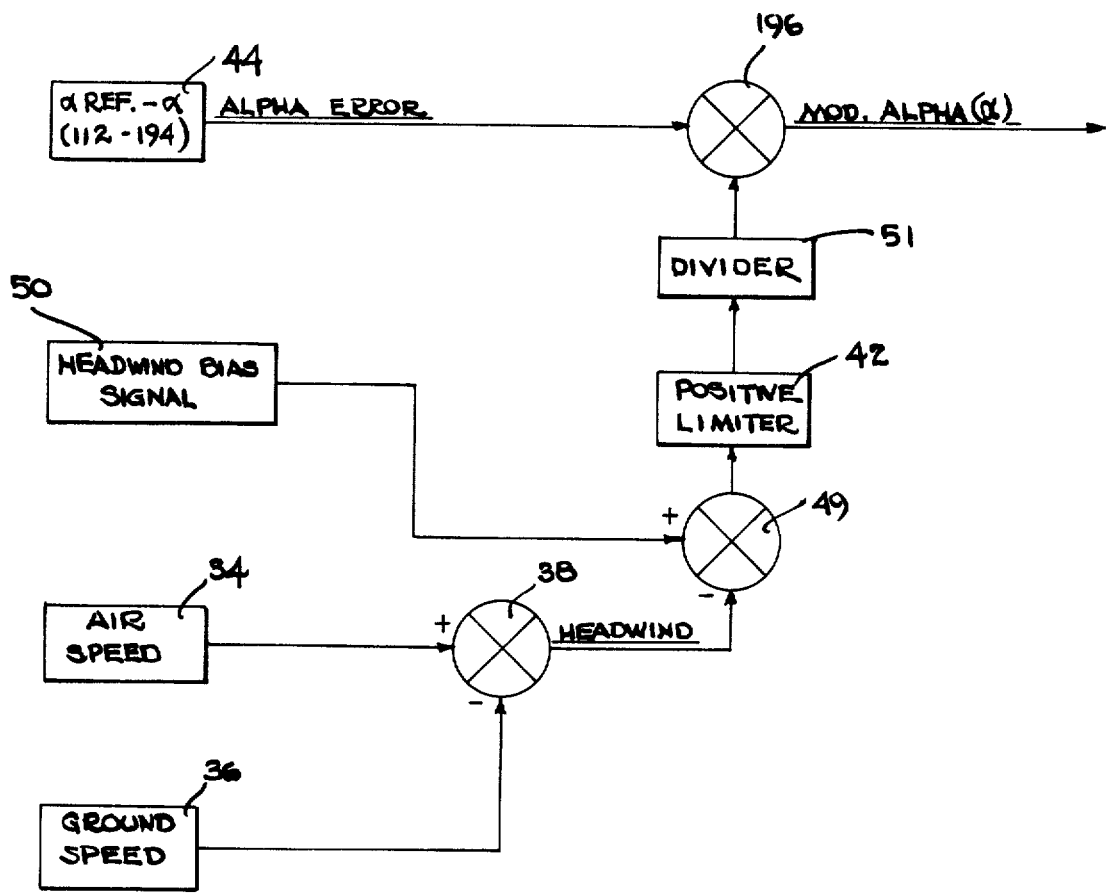
FIG. 4 illustrates a third embodiment of the invention.

Referring to FIG. 4, a third embodiment of the invention is illustrated which, as for the second embodiment, is for use in situations where a signal in accordance with runway wind cannot be provided. This embodiment is similar to that of FIG. 1 except for the use of a fixed headwind bias signal 50 as the input to summing device 40 rather than a signal representing runway wind and the division of the output of the limiter by a predetermined factor. This bias signal is given a value such that a predetermined minimum headwind signal is required to effect any change in the alpha ($\alpha$) error signal. As in the embodiment of FIG. 1, the output of summing device 40 is limited to negative values, i.e. an output will only be provided when the measured headwind signal exceeds the headwind bias signal. The output of limiter 42 is divided by a predetermined scaling factor in divider 51 and the output of the divider fed to summing device 196 to modify the alpha error signal.

While the invention has been described and illustrated in detail, it is to be clearly understood that this is intended by way of illustration and example only and is not to be taken by way of limitation, the spirit and scope of this invention being limited only by the terms of the following claims.

I claim:

1. In an aircraft speed control system including means for providing a first signal which is a function of airspeed error constituting the difference between actual airspeed and a pilot selected airspeed, means for providing a second signal which is a function of lift error (alpha error) constituting the difference between actual lift and a pilot commanded lift, means for comparing the signals and selecting the greater of the two and a utilization mechanism connected to receive the selected signal, the improvement comprising:

means connected to receive said second signal for increasing the second signal to compensate for any decrease in headwind between that during landing approach and that anticipated on the runway at touchdown including:

means for providing a third signal which is a proportion of the headwind during the final landing approach of the aircraft, and means for adding such third signal to said second signal.

2. The system of claim 1 wherein said third signal is a predetermined fraction of the headwind.

3. The system of claim 2 wherein said fraction is substantially one half.

4. The system of claim 1 wherein said third signal is a function of the difference between a signal representing the headwind during final landing approach and a signal representing an estimated value of runway wind in a direction opposite to the direction of anticipated landing.

5. The system of claim 1 wherein the means for providing said third signal comprises means for computing the difference between the airspeed and ground speed for the aircraft to provide a signal in accordance with headwind, means for providing a signal in accordance with runway wind in a direction opposite to the direction of anticipated landing, and means connected to receive said runway wind and headwind signals for computing the difference between said runway wind and said headwind signals, said means for adding said third signal to said second signal adding said signals only when the runway wind is lower than the headwind.

6. The system of claim 5 wherein said means for adding said third signal to said second signal only when the runway wind is lower than the headwind comprises limiter means for providing an output only when the headwind signal exceeds the runway wind signal.

7. A speed control system for an aircraft comprising means for generating a first signal which is a function of airspeed error constituting the difference between actual airspeed and a pilot selected airspeed, means for generating a second signal which is a function of lift error (alpha error) constituting the difference between actual lift and pilot commanded lift, means for generating a third signal which is a function of the difference between the headwind during the final landing approach of the aircraft and the runway wind in a direction opposite to the direction of anticipated landing, summing means connected to receive said second and third signals for adding said third signal to said second signal only when the runway wind is lower than the headwind, means for comparing said first signal with the output of said summing means and selecting the greater of the two, and a utilization mechanism connected to receive the selected signal.

8. The system of claim 7 wherein the means for generating said third signal comprises means for computing the difference between the airspeed and the groundspeed of the aircraft to provide a signal in accordance with headwind, means for providing a signal in accordance with runway wind, and means for computing the difference between said runway wind and headwind signals.

9. The system of claims 7 or 8 wherein the means for adding said third signal to said second signal only when the runway wind is lower than the headwind comprises limiter means for providing an output only when the headwind signal exceeds the runway wind signal.

10. The system of claim 1 wherein said third signal is a function of values of headwind during final landing approach which are greater than a predetermined minimum value, said third signal having a zero value when said headwind is less than said predetermined minimum value.

* * * * *